A. A. DORSEY.
CORN HARVESTER.
APPLICATION FILED NOV. 15, 1910.
1,015,942.
Patented Jan. 30, 1912.
3 SHEETS—SHEET 2.
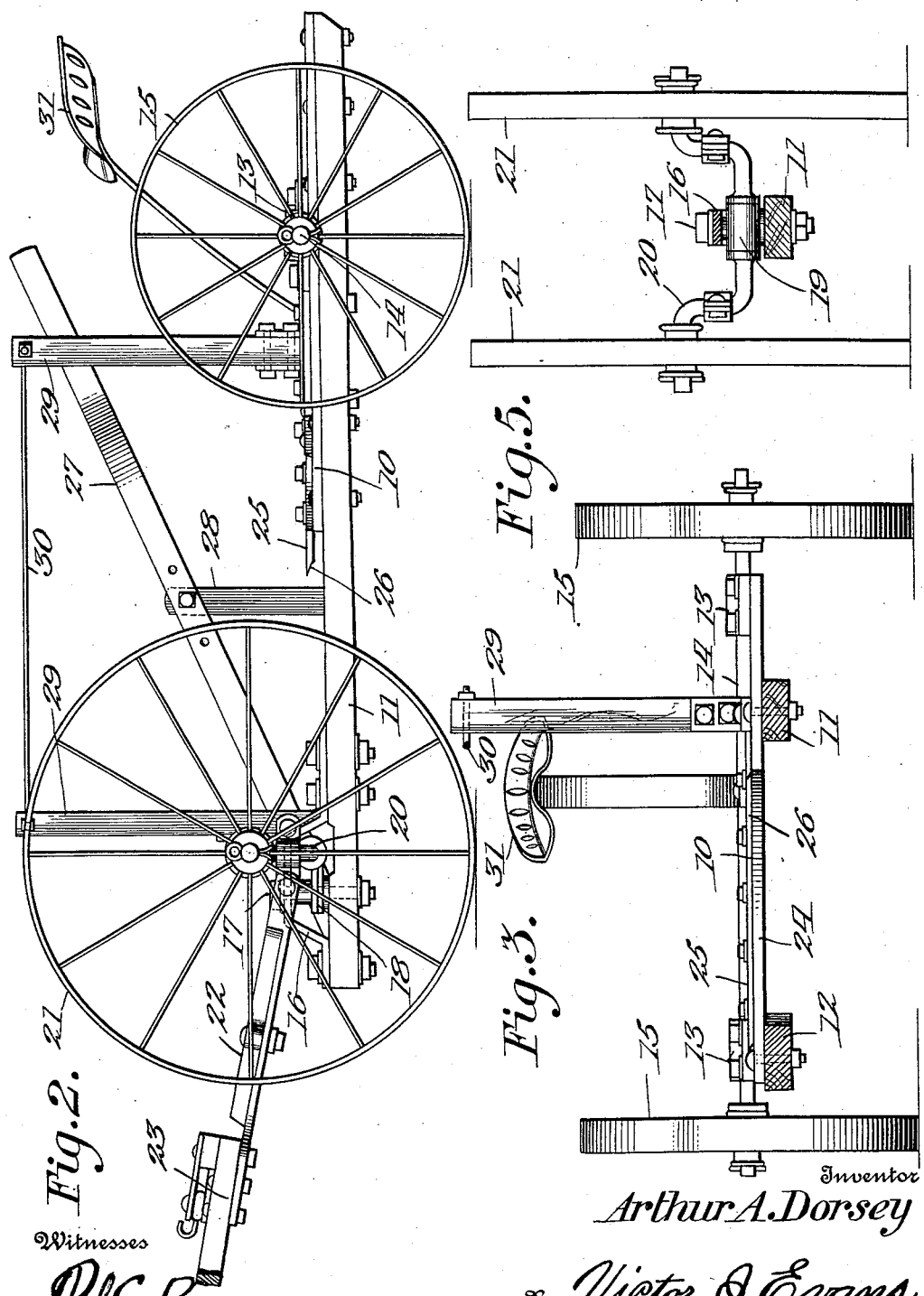
Witnesses
Phil E. Barnes
Inventor
Arthur A. Dorsey
By Victor J. Evans
Attorney A. A. DORSEY.
CORN HARVESTER.
APPLICATION FILED NOV. 15, 1910.
1,015,942.
Patented Jan. 30, 1912.
3 SHEETS—SHEET 3.
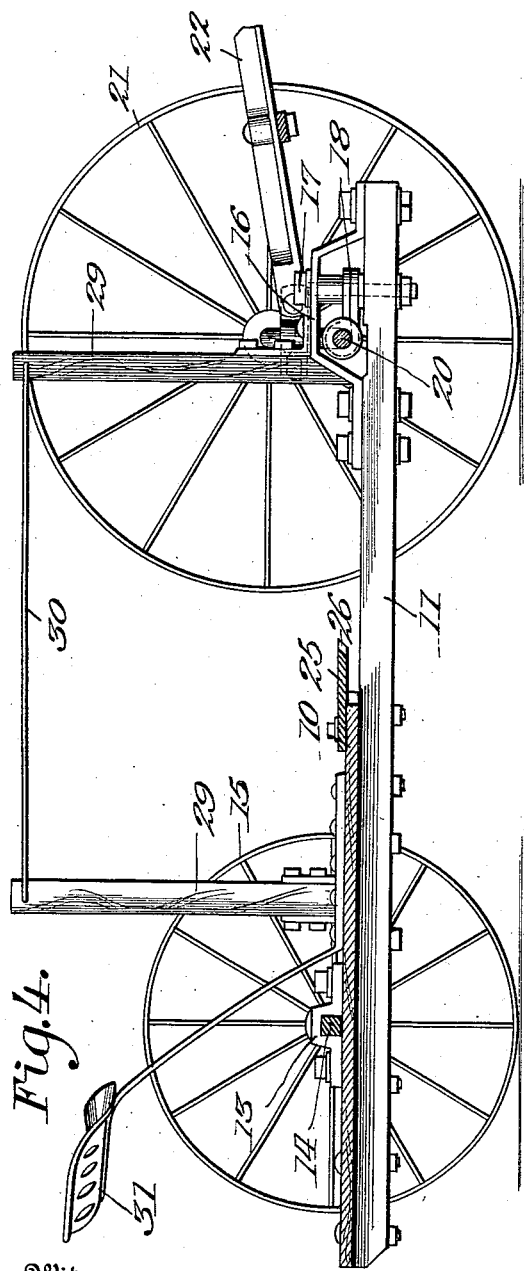
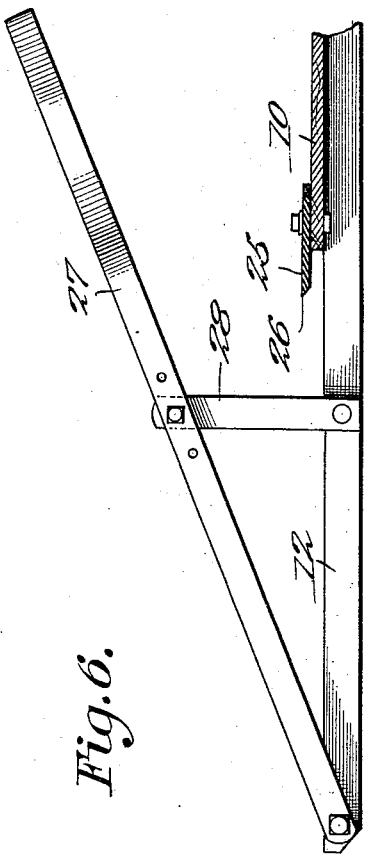
Witnesses
Inventor
Arthur A. Dorsey
By Victor J. Evans
Attorney

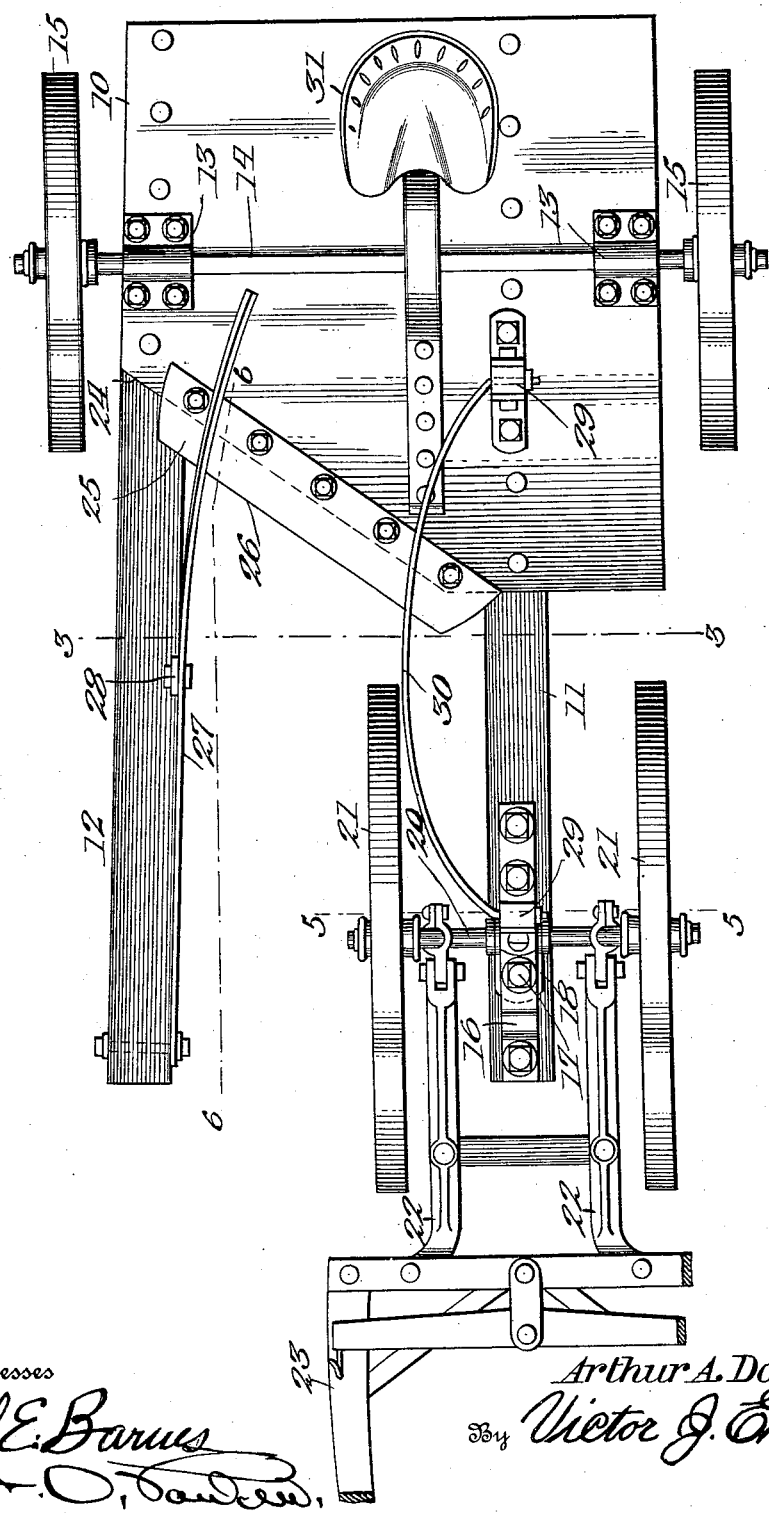

UNITED STATES PATENT OFFICE.

ARTHUR A. DORSEY, OF FULTON, KANSAS.

CORN-HARVESTER.

1,015,942.  Specification of Letters Patent.  Patented Jan. 30, 1912.

Application filed November 15, 1910. Serial No. 592,544.

*To all whom it may concern:*

Be it known that I, ARTHUR A. DORSEY, a citizen of the United States, residing at Fulton, in the county of Bourbon and State of Kansas, have invented new and useful Improvements in Corn-Harvesters, of which the following is a specification.

The invention relates to a corn harvesting machine, and more particularly to the class of one-row corn harvesters.

The primary object of the invention is the provision of a machine of this character in which the growing corn stalks may be severed from the ground when the machine is being pulled over the same, thus obviating the necessity of the hand harvesting of the crop.

Another object of the invention is the provision of a corn harvester in which standing corn may be severed from the ground when planted in single rows, the standing corn being deflected toward a cutter, which latter serves to sever the corn when the machine is being drawn through a field.

A further object is the provision of a machine of this character which is simple of construction, thoroughly efficient and reliable in operation, and that may be manufactured at a minimum expense.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a top plan view of a machine constructed in accordance with the invention. Fig. 2 is a side elevation thereof. Fig. 3 is a transverse sectional view on the line 3—3 of Fig. 1. Fig. 4 is a vertical longitudinal sectional view through the machine. Fig. 5 is a further transverse sectional view on the line 5—5 of Fig. 1. Fig. 6 is a fragmentary sectional view on the line 6—6 of Fig. 1.

Similar reference characters indicate corresponding parts throughout the several views of the drawings.

Referring to the drawings by numerals, the machine comprises a frame, including a platform or deck 10, to which latter are secured longitudinal sills 11 and 12, the sill 12 being disposed in parallel relation to the sill 11, and these sills are suitably secured at their rear ends to the under face of the platform or deck 10. Secured to the upper face of the platform or deck 10 are transversely arranged alining bearings 13, in which is fixed a rear axle 14 carrying at opposite ends the usual ground or traction wheels 15, the latter being journaled thereon.

Suitably secured to the forward end of the sill 11 is an upwardly bowed strap 16 formed with an opening, through which is centrally passed a detachable king bolt or pin 17, the same being designed to serve as a swivel connection for a turning plate 18 provided with an eye or sleeve 19, with which latter is engaged the cross connecting portion of a U-shaped axle 20 carrying at its journal ends front ground or traction wheels 21, the latter being of greater diameter than the rear ground wheels 15, so that the deck or the platform 10 will be sustained in substantially horizontal position. Detachably clipped to the vertical portions of the U-shaped axle 20 are thill supporting irons 22, the same being connected at their forward ends in any suitable manner to a thill 23, to which is attached the draft animal, whereby the machine may be pulled through a field.

The platform or deck 10 between the sills 11 and 12 is provided with a diagonal forward edge 24, to which is detachably secured a diagonally arranged cutting bar or blade 25, the same being provided with a beveled cutting edge 26, and when the machine is advanced standing corn stalks will pass between the sills 11 and 12 and be severed by the cutting blade.

Secured to the forward end of the sill 12 is a rearwardly extending laterally curved guard rail or bar 27, the latter being braced by means of a brace bar 28, fixed thereto and to the said sill 12 and spaced from its forward end. This guard rail or bar 27 will direct the standing stalks or any tilting stalks into the path of the cutting blade 25 to be severed thereby when the machine is being pulled through a field.

Secured to the forward end of the sill 12 respectively and rising therefrom are vertical posts or uprights 29, to which are connected the ends of a bowed guard rail 30, which is designed for holding the corn stalks after being severed by the cutting blade 25.

In the operation of the machine, the same is drawn across the field by an animal, so that the standing corn stalks in a single row will pass between the sills 11 and 12 into the path of the cutting bar or blade 25, whereby the latter will sever the standing stalks from the ground. Should any of the standing stalks be in dropping position, or in fallen position to one side of the row, the guard rail 27 will elevate the fallen stalks to direct the same into the space or throat between the sills 11 and 12 for the severing operation by the cutter bar or blade. Secured to and rising from the frame is the ordinary teamster's seat 31, the same being supported by a standard of the ordinary well-known construction. The severed corn stalks will fall upon the platform or deck 10, as the machine advances, and an operator will dispose of such stalks by throwing the same from said platform or deck rearwardly onto the ground.

What is claimed is:

A machine of the class described, comprising a platform, a pair of sills fixed to and extending forwardly from the platform in parallel relation to each other, a cutter element mounted at the front edge of the platform between said sills, a rearwardly extending laterally curved guard rail secured to one of said sills, an upright secured to the other of said sills, a second upright secured to said platform parallel to and in longitudinal alinement with the first named upright, and a second guard rail secured to said uprights and bowed in the direction of curvature of the first named guard rail, both of said guard rails coöperating with said cutting element in the manner set forth.

In testimony whereof I affix my signature in presence of two witnesses.

ARTHUR A. DORSEY.

Witnesses:
HUBERT LARDNER,
W. R. BIDDLE.

Copies of this patent may be obtained for five cents each, by addressing the "Commissioner of Patents, Washington, D. C."